United States Patent [19]

Rouzaud

[11] Patent Number: 4,487,536
[45] Date of Patent: Dec. 11, 1984

[54] DISTRIBUTING DEVICE OF THE PRESSURE EXERTED BY A MACHINE-TOOL CARRIAGE ON ITS SLIDES

[75] Inventor: Guy Rouzaud, Chatenay, France

[73] Assignee: Centre D'Etudes Du Fraisage, Bagneux, France

[21] Appl. No.: 392,756

[22] Filed: Jun. 28, 1982

[30] Foreign Application Priority Data

Jul. 15, 1981 [FR] France ................. 81 13748

[51] Int. Cl.³ ...................... B23B 47/26; B23Q 23/00
[52] U.S. Cl. ..................................... 409/239; 408/235
[58] Field of Search ..................... 409/237, 238, 239; 408/235, 234

[56] References Cited

U.S. PATENT DOCUMENTS 3,720,134  3/1973  Zeleny .............................. 409/238
4,117,762 10/1978  Sachot ........................... 408/235 X

FOREIGN PATENT DOCUMENTS 1015420 12/1965  United Kingdom ............... 408/235
0602348  4/1978  U.S.S.R. ............................. 409/238

Primary Examiner—Z. R. Bilinsky
Attorney, Agent, or Firm—Darby & Darby

[57] ABSTRACT

An apparatus for making the pressure exerted by a machine-tool carriage on its slide uniform. Cams which load springs are used to apply pressure to the carriage in those regions subject to less pressure depending upon the position of the carriage. Distortion of the tool carriage slide surface and resulting inaccuracies in the machine operation are thus reduced.

6 Claims, 10 Drawing Figures

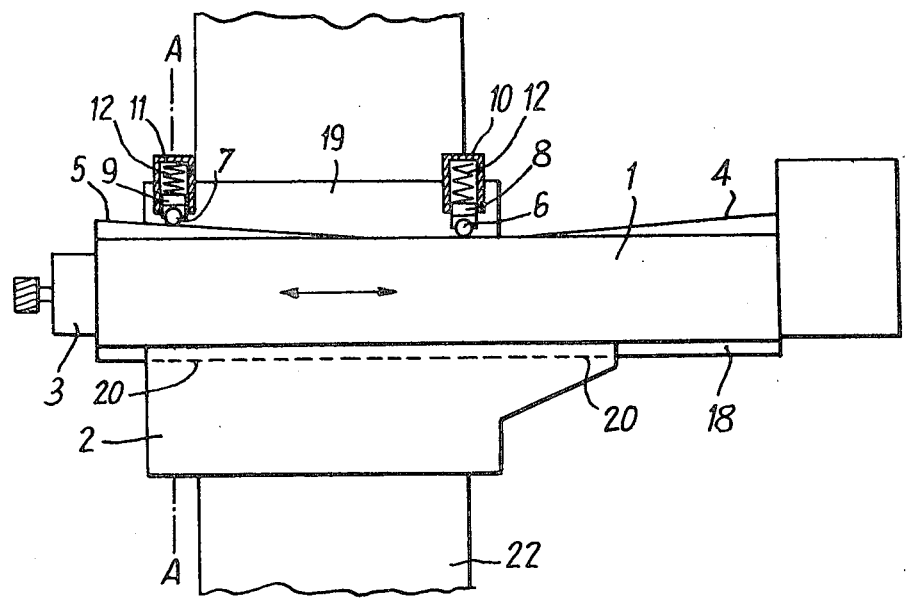
Fig:1
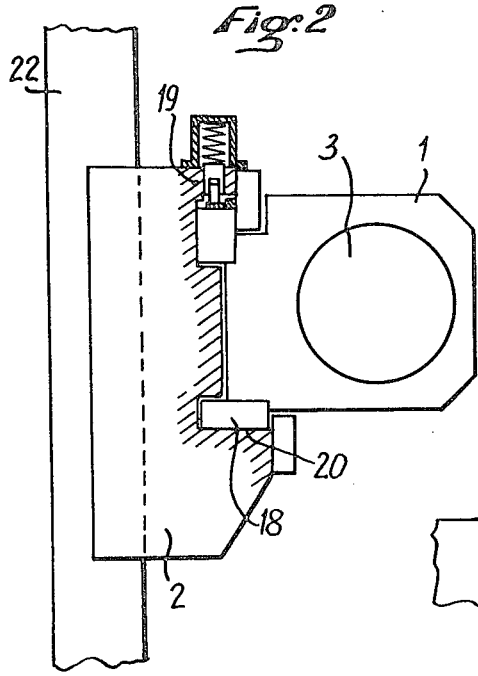
Fig:2
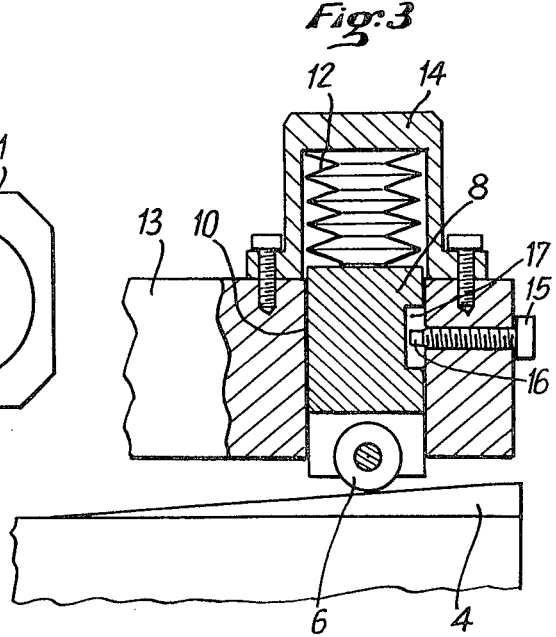
Fig:3

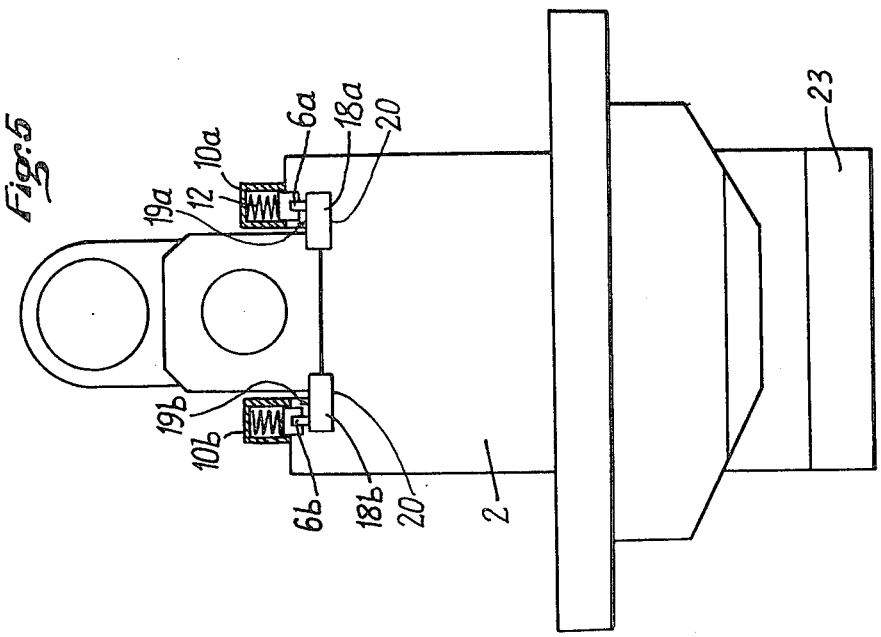
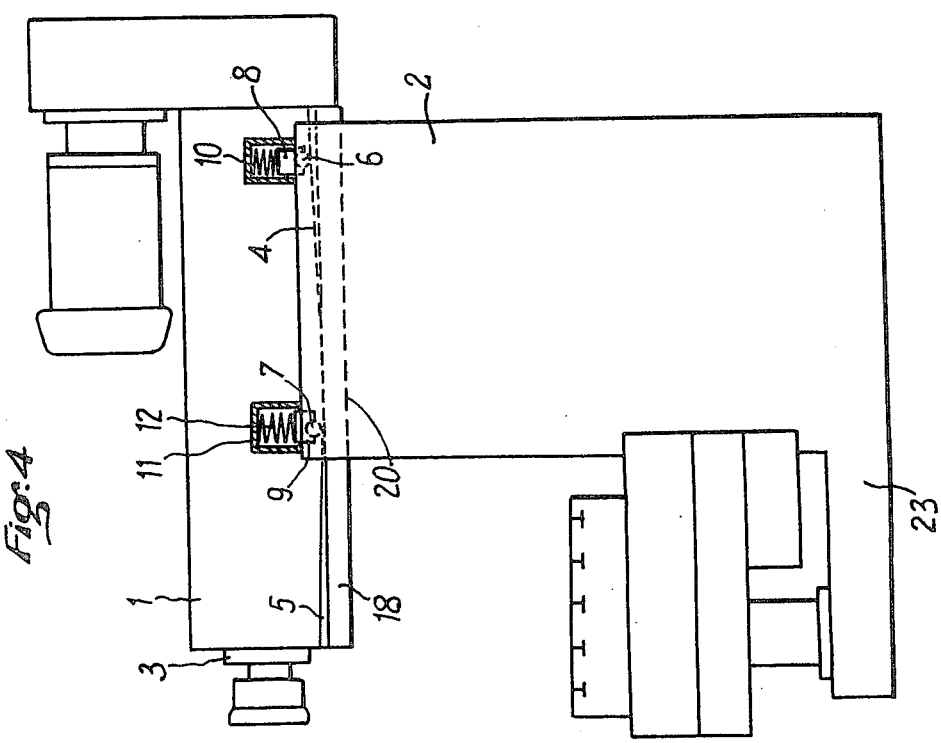

DISTRIBUTING DEVICE OF THE PRESSURE EXERTED BY A MACHINE-TOOL CARRIAGE ON ITS SLIDES

FIELD OF THE INVENTION

In machine-tools comprising a carriage sliding horizontally, such as a miller carriage or ram supporting the spindle-holding head, the centre of gravity of the carriage is displaced and, therefore, the diagram of the pressures exerted by the carriage on the slides is variable, and in its advanced and retracted positions, this carriage is likely to be subjected to a large overhang and to have a tendency to tip.

On the other hand, it is advantageous to cover the friction faces of the cast iron or steel counter-slides carried by the support or frame on which slides the carriage with a material having a small coefficient of friction, such as a plastics material blade of appropriate characteristics, thereby reducing the carriage displacement effort, authorizing a greater displacement speed for the same power of the motors, and providing, for very short displacements or displacements at a very slow speed, movements devoid of jerks or of the phenomenon currently known as "stick slip".

But this material is subjected to a compression deformation of unequal importance according to the position of the carriage, which tends to reduce the position accuracy of the tool since the forces resulting from the compression of the blade made of a material having a small coefficient of friction distribute themselves so as to balance the forces of gravity applied by the carriage, which are variable in position and vary the hereabove compression deformation.

BACKGROUND OF PRIOR ART

Various solutions have already been advocated in order to remedy the difficulties created by the carriage displacements.

Some of them consist in providing a counter-weight exerting on the carriage relief efforts the resultant of which is variable in position according to the position of the centre of gravity of the carriage and creating a tipping moment which is antagonistic to that caused by the carriage displacements.

A further solution disclosed in French Pat. No. 75.03217 (published under No. 2.299.117) filed on Feb. 3, 1975, to Société HURE, consists in providing one or several cam-shaped bars, supported by the carriage, co-acting with rollers carried by the carriage support, the bars and rollers being disposed and having a configuration such as to apply to the anterior portion of the ram a force in the upward direction and balancing the weight of the overhanging portion of the carriage.

OBJECTS AND SUMMARY OF THE INVENTION

However, this solution is of a complex and costly construction and the object of the present invention is a solution which is simplified and easy to practice.

According to the invention, the carriage supports, opposite each lower counter-slide of the support, two longitudinal cams, situated respectively on each of its front and rear portions and the upper counter-slide of the support comprises at each of its ends a roller rolling on the corresponding cam and vertically and slidably mounted against a spring or equivalent, the profile of the cams and the characteristics of the springs being established such that the diagram of the pressures exerted by the carriage weight and the effort applied by the rollers provide a distribution of the pressures which is almost uniform whatever the position of the carriage, with a resultant centered permanently in the median area of the lower counter-slide of the support.

Due to this means, the compression deformation of the material of small coefficient of friction remains constant within the limits of the tool positioning tolerances, the carriage remains constantly applied on its sliding reference face and the stability of the assembly is improved in all positions.

On the other hand, the device allows a ram or carriage stroke larger than the length of the support or console while preserving the resultant of the weight and of the forces of the rollers on the support slide and preserving a pressure distribution which is compatible with the mechanical strength of the material of low coefficient of friction.

Finally, the solution has the advantage of a great mechanical simplicity. It is true that the forces applied on the slides are not reduced but increased by those exerted by the rollers, but the advantage resulting from the re-centering of these forces makes the disadvantages of this increase negligible, since the surface pressure per length unit is not only regulated but reduced relative to the maximum previously reached, this being much more important.

The invention has also as objects the following dispositions:

(a) The distance between the lowest points of the cam is smaller than or equal to the distance between the rollers.

(b) The profile of the cams is such than when the centre of gravity of the carriage is in its central position, viz. in the vicinity of the mid-point of the lower slides, the pressures exerted by the rollers are equal.

(c) The front and rear portions of the carriage which are covered by the cams extend at least from the points respectively occupied on the carriage when in a central position by the front and rear rollers, to the points occupied respectively by the same rollers when the carriage is completely retracted and when it is completely advanced.

(d) The length of the cam is greater than or equal to the corresponding stroke of the carriage from the central position.

The expression "corresponding stroke" is used for describing the carriage stroke where said cam is active.

(e) The cams are laterally off-set.

BRIEF DESCRIPTION OF THE DRAWINGS

The invention will become more apparent from the following detailed description and with reference to the accompanying drawings wherein:

FIG. 1 is a side schematic view illustrating the principle of the invention,

FIG. 2 is a transverse sectional view along line A—A of FIG. 1,

FIG. 3 is a detailed view, in longitudinal section, of an embodiment of the mounting of the rollers, FIGS. 4 and 5 show schematically, in a way similar to FIGS. 1 and 2, an alternative embodiment of the invention.

DETAILED DESCRIPTION OF THE EMBODIMENTS

Figure 6:
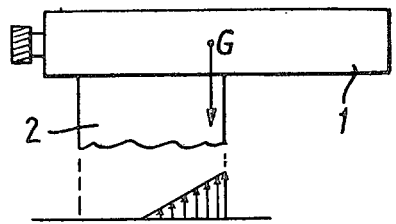
FIGS. 6 to 10 show the distribution of the pressures on the slides, obtained by means of the invention.

Reference being made to said Figures, one sees that the invention applies to a carriage 1 of a machine-tool, sliding on a support 2, which can be a console sliding itself on an upright 22 (FIGS. 1 and 2) or the frame 23 of the machine (FIGS. 4 and 5), where the carriage 1 comprises in its front portion a tool-holding head 3 of any type.

According to the invention, the carriage 1 supports, opposite each lower slide 18, two longitudinal cams 4 and 5 situated on the front portion and on the rear portion of carriage 1 and each counter-slide 19, the support 2 carries at both its ends rollers 6, 7 mounted on pistons 8, 9 sliding inside housing 10-11 of support 2 against springs or equivalent devices 12. The profile of each cam and the characteristics of springs 12 are chosen such that the efforts applied by the springs 12, in combination with the efforts of gravity of carriage 1, provide an almost uniform pressure distribution, with a resultant centered on the median region of the support counter-slides 20.

FIG. 3 shows a detail of realization wherein the roller 6 is mounted on the piston 8 in a housing 10 provided in a part 13 connected to support 2 and which can be the upper counter-slide 19.

At the rear of piston 8 is provided a stacking of resilient washers forming a spring 12 mounted in a socket 14 screwed on part 13. A side screw 15 carries an antirotation stud 16 sliding in a groove 17 of piston 8.

Figure 7:
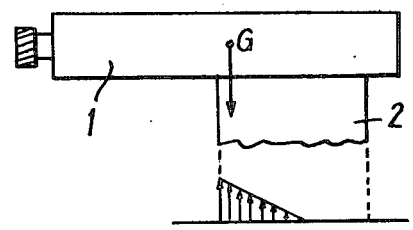

The pressure distribution resulting from the displacements of the carriage in the absence of the dispositions of the invention is shown in FIGS. 6 and 7 for the extreme positions. One sees that the pressure is distributed very unevenly and varies, at the ends of support 2, from a maximum value to a zero value.

If the counter-slides of support 2 on which slide the slides 18 of the carriage are coated with a plastics material of small coefficient of friction, having a thickness of 1 to 2 mm for example, the deformation of this material will be very unequal and its thickness will be reduced from one of the ends to the other, producing precision faults of the tool possibly reaching several hundredths of a millimeter.

Figure 8:
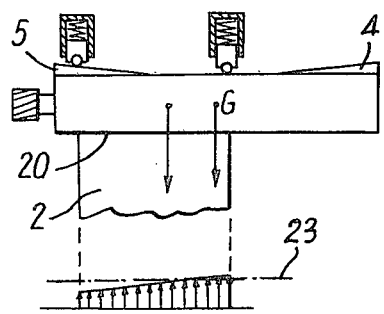
Figure 9:
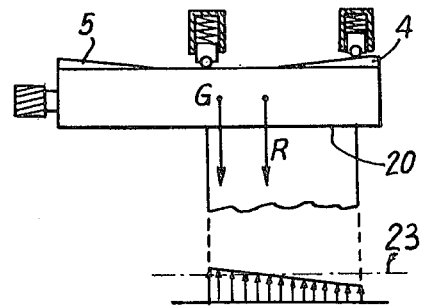
Figure 10:
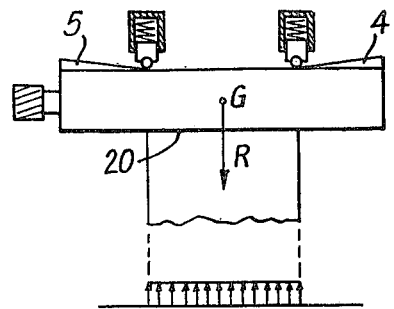

A satisfactory pressure distribution obtained by means of the invention is shown in FIGS. 8, 9 and 10 where one sees that in the extreme positions, this distribution is almost uniform, the resultant R of the forces of gravity and of the forces applied by springs 12 being constantly maintained in the median region of the support counter-slide 20.

Through the design of cams 4 and 5 and the choice of springs 12 (or of an equivalent such as a hydraulic or oleopneumatic means), a pressure distribution more uniform than that shown by the chain-dot line 23 can be obtained.

These pressure distributions offer a very great advantage in that they reduce the surface pressure per surface unit relative to the maximum value which it reached at the end of the slides, in the case of FIGS. 6 and 7.

In order to provide a satisfactory pressure distribution according to the invention, it is preferable that the distance separating the lowest points of the cams is not larger than the distance between the rollers 6 and 7 and that, when the carriage is in its central position, the pressures exerted by the rollers are equal (and possibly zero).

Thus, as soon as the carriage leaves this central position (as defined hereabove) one at least of the rollers exerts a pressure.

The lengths of the cams are determined according to the characteristics of the upper and lower counter-slides which do not have necessary the same length nor the same position. Rollers 6 and 7 are situated as close as possible of the ends of the upper counter-slide 19 of support 2. The rear and front cams, respectively 4 and 5, extend respectively from the points occupied by rollers 6 and 7 when the carriage is in the central position, to the front and rear ends of the carriage. They can extend more to the middle of the carriage, and the springs 12 can be established so as to provide a permanent pressure whatever the position of the carriage.

On the other hand, cams 4 and 5 can be laterally off-set so that the roller corresponding to a cam cannot cooperate with the other cam whatever the stroke of carriage 1. This arrangement allows increasing the carriage stroke in each direction from the central position while proving each cam with a length greater than the corresponding stroke of the carriage (stroke from the central position to the extreme rear position for cam 5 and to the extreme foreward position for cam 4).

In the example of FIGS. 1 and 2, the carriage 1 is of the type mounted on a support 2 sliding vertically on an upright 22, the carriage 1 being supported by side slides superimposed on a single side.

In this case, there is only a single cam 4 and a single cam 5 with the corresponding rollers 6 and 7.

In the case of FIGS. 4 and 5 where the carriage bears on support 2 via two lower slides 18a, 18b, one on each side, two cams 4 and two cams 5 are provided, one on each side, and each associated with the corresponding roller 6a, 6b, 7a, 7b.

I claim:

1. A pressure distribution device for a machine tool of the type including a carriage having upper and lower sliding means disposed thereon for sliding horizontally on a support having at least a lower counter slide in slidable contact with said lower sliding means, the weight of said carriage bearing upon said lower slide and counter slide wherein said pressure distribution device comprises:
   first and second longitudinal cams rigidly affixed to said carriage and spaced apart horizontally having a substantially horizontal surface therebetween, said cams having inclined surfaces intersecting said horizontal surface and extending upwardly therefrom; and
   an upper counterslide disposed on said support comprising at each of its ends first and second vertically moveable roller means disposed opposite said first and second cams for respectively rolling on said first and second cams, spring means coupled to said rollers having a substantially vertical spring force for applying force to said rollers, said spring force increasing the downward force on said carriage being selected to supplement the weight of said carriage to provide a substantially uniform pressure distribution on said lower counter slide.

2. A device according to claim 7, wherein the distance between the lowest point of the cams is smaller than or equal to the distance between the rollers.

3. A device according to any one of the preceding claims, wherein the profile of the cams is such that when the centre of gravity of the carriage is in its central position, the pressures exerted by the rollers are equal.

4. A device according to claim 3, wherein the first and second portions of the carriage which are covered by the cams extend at least from the points respectively occupied on the carriage in a central position by the front and rear rollers, to the points respectively occupied by the same rollers when the carriage is completely retracted or is completely advanced.

5. A device according to claim 3, wherein the length of the cam is greater than or equal to the corresponding stroke of the carriage from the central position.

6. A device according to claim 3, wherein the first and second cams are laterally off-set.

* * * * *